United States Patent [19]

Saretzky

[11] 4,044,924
[45] Aug. 30, 1977

[54] ADJUSTABLE PROGRESSIVE DISTRIBUTOR VALVE

[75] Inventor: Horst Saretzky, Ennepetal, Germany

[73] Assignee: De Limon Fluhme & Co., Dusseldorf, Germany

[21] Appl. No.: 599,587

[22] Filed: July 28, 1975

[30] Foreign Application Priority Data

Aug. 3, 1974 Germany .............................. 2437473

[51] Int. Cl.² ............................................. F01M 1/02
[52] U.S. Cl. .................................. 222/250; 184/7 E; 222/308
[58] Field of Search ...................... 184/7 D, 7 E, 7 F; 222/249, 250, 255, 263, 275, 330, 282, 307, 308

[56] References Cited

U.S. PATENT DOCUMENTS

| | | | |
|---|---|---|---|
| 2,183,986 | 12/1939 | Corey | 184/7 E |
| 2,792,911 | 5/1957 | Harter | 184/7 E |
| 3,219,146 | 11/1965 | Leese et al. | 184/7 F |
| 3,422,926 | 1/1969 | Stanaway | 184/7 F |

*Primary Examiner*—Robert G. Nilson
*Attorney, Agent, or Firm*—Joseph A. Geiger

[57] ABSTRACT

An adjustable progressive distributor valve for the intermittent metered distribution of lubricant to a plurality of branch lines by means of several free valve plungers reciprocating inside the main bores of several adjoining valve segments, the effective volume of each metering chamber being adjustable by means of a metering plunger and an adjustable drag connection between the latter and the valve plunger, so that the two plungers act as differential pistons over an adjustable length portion of the fixed valve plunger stroke.

10 Claims, 2 Drawing Figures

ADJUSTABLE PROGRESSIVE DISTRIBUTOR VALVE

BACKGROUND OF THE INVENTION

1. Field of the Invention

The present invention relates to cycling distributor valves with free valve plungers, and more particularly to multiple-plunger distributor valves for the supply of lubricant at different rates to a number of destination points, in accordance with the progressive cycling operation of the valve plungers.

2. Description of the Prior Art

Progressive distributor valves of the above-mentioned type are primarily used in conjunction with the supply of lubrication oil or grease from a central pressure lubrication unit to a number of separate points of lubrication or to subsidiary distributor valves. This kind of progressive distributor valve may also be used in connection with other applications, where a common supply of a pressurized medium is to be subdivided into a plurality of separate branch flows and where the rate at which the medium is fed into the separate branches is to be different from branch to branch.

A progressive distributor valve achieves this by virtue of its cycling operation which involves several, i.e. at least three, free valve plungers, each being usually accommodated inside a separate valve segment, the valve segments being combined into a compact valve block assembly. Each valve plunger, by executing a reciprocating motion of fixed stroke length inside its bore, discharges lubricant alternatingly to two branch lines, the quantity involved being determined by the plunger diameter and by its stroke. The plunger also performs a control function for the next-following plunger, as soon as it reaches an end position. For this reason, it is necessary that the plunger strokes remain constant and are not adjustable for a possible adjustment of the quantities of lubricant supplied to the branch lines. These restrictions apply generally to all conventional progressive distributor valves, as well as to parallel-controlled progressive distributor valves.

Accordingly, it remains a major problem with all progressive distributor valves to obtain some sort of adjustability for the quantities of lubricant which are discharged into the branch lines. In most cases, the determination of the quantities supplied to the branch lines can only be made by accordingly sizing the diameter of each valve plunger. The prior art in this field therefore includes distributor valves having several valve plungers of unequal diameter for the supply of different quantities of lubricant to the corresponding branch lines.

Also known from the prior art are attempts to adjust the strokes of the valve plungers. Because of the earlier-mentioned additional control function of the valve plungers, however, these devices have not met with success, due to operational difficulties connected with said control function of the valve plungers during cycling. Consequently, it is generally accepted that the strokes of the valve plungers should remain constant and should not be made adjustable for increasing or decreasing the amount of lubricant supplied to the branch lines.

A known adjustable progressive distributor valve is described in German Pat. No. 1,625,894. In this device, several valve plungers operate in a cycling operation, moving over fixed strokes, under the action of a pressurized supply of lubricant. Each plunger has a central axial bore therethrough, inside which is arranged a metering plunger which is movable relative to the surrounding valve plunger. This metering plunger has an adjustable stroke determined by abutment members which are adjustable independently of the stroke of the valve plunger. A resetting of these abutment members thus produces a corresponding change in the volume of lubricant discharged during each valve plunger movement, by changing the stroke of the central metering plunger.

A shortcoming of the above prior art device relates to the fact that an adjustment of the stroke of the central metering plunger affects both branch lines fed by the valve plunger in the same way. For many practical applications, however, this simultaneous adjustment of two branch lines is undesirable, because of conditions which require that each line be adjustable independently of all other branch lines. A compromise solution of the kind offered in the above prior art device may then necessitate the supply of excess lubricant to some branch lines, in order to have an adequate supply to other branch lines. Additional difficulties may arise in a situation, where volume adjustments on a particular line are necessary under changing operating conditions, which adjustments then may necessitate the undoing of optimal volume adjustments for associated branch lines.

SUMMARY OF THE INVENTION

Underlying the present invention is the primary objective of devising an improved adjustable progressive distributor valve of the above-mentioned type in which the volumes discharged by each valve plunger are separately adjustable for each branch line, so that the supply of lubricant to a plurality of separate points of lubrication is independently adjustable for each of these points, or, where the branch lines lead to subsidiary distributor valves, the quantities supplied to each valve are adjustable independently of any other adjustments in the system. This adjustability is to be achieved without changing the strokes of the valve plungers, thereby assuring operational reliability of the latter in their control function.

In order to attain the above objectives, the present invention suggests an adjustable progressive distributor valve of the earlier-mentioned type which has separate metering plungers associated with the two metering chambers of each valve plunger, each metering plunger being adjustably connected to the valve plunger so as to be entrained by the latter over an adjustable stroke. The separate adjustability of the stroke of each metering plunger accounts for the desired adjustability of the volume of lubricant supplied to each branch line. The adjustable connection between the valve plunger and its two associated metering plungers includes a "dragging" relationship between the two plungers which is adjustable by means of an adjustable abutment member. The latter, in one extreme adjustment position, does not engage the metering plunger at all, so that the plunger remains stationary, whereas in the other extreme adjustment position, it completely suppresses any relative motion between the two plungers so that the metering plunger executes the same stroke as the valve plunger.

In a preferred embodiment of the invention, each of the three or more valve plungers is arranged inside a suitable valve segment, the latter having a cylindrical through-bore as a main bore for the valve plunger and two special end caps closing the ends of the main bore.

Each end cap further has a coaxial cylindrical bore of a diameter somewhat smaller than the main bore, for the accommodation therein of a metering plunger. The latter, in its fully engaged position, protrudes from the inner side of the end cap only with an abutment collar which, in cooperation with the associated end face of the end cap, serves to delimit the stroke of the valve plunger.

The adjustable connection between the valve plunger and the metering plunger is preferably provided in the form of a rotatable spindle which extends from the valve plunger through a central bore of the metering plunger, and which carries on a threaded outer portion an axially adjustable nut whose position determines the distance over which the metering piston is moved into the feed chamber, as the valve plunger moves to the opposite end position. As an additional advantageous feature, the preferred embodiment further suggests that the spindle extending from the valve plunger be rotatable, but axially confined in relation to the latter and that the adjustable abutment nut on the spindle be rotatably blocked by a matching bore inside the end cap. Accordingly, adjustments can be made with a convenient tool, by simply rotating the spindle inside the nonrotatable, but axially slidable nut. The latter is preferably hexagonal in outline, cooperating with a matching hexagonal bore in the head of the end cap.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows.

DESCRIPTION OF THE PREFERRED EMBODIMENT

Figure 1:
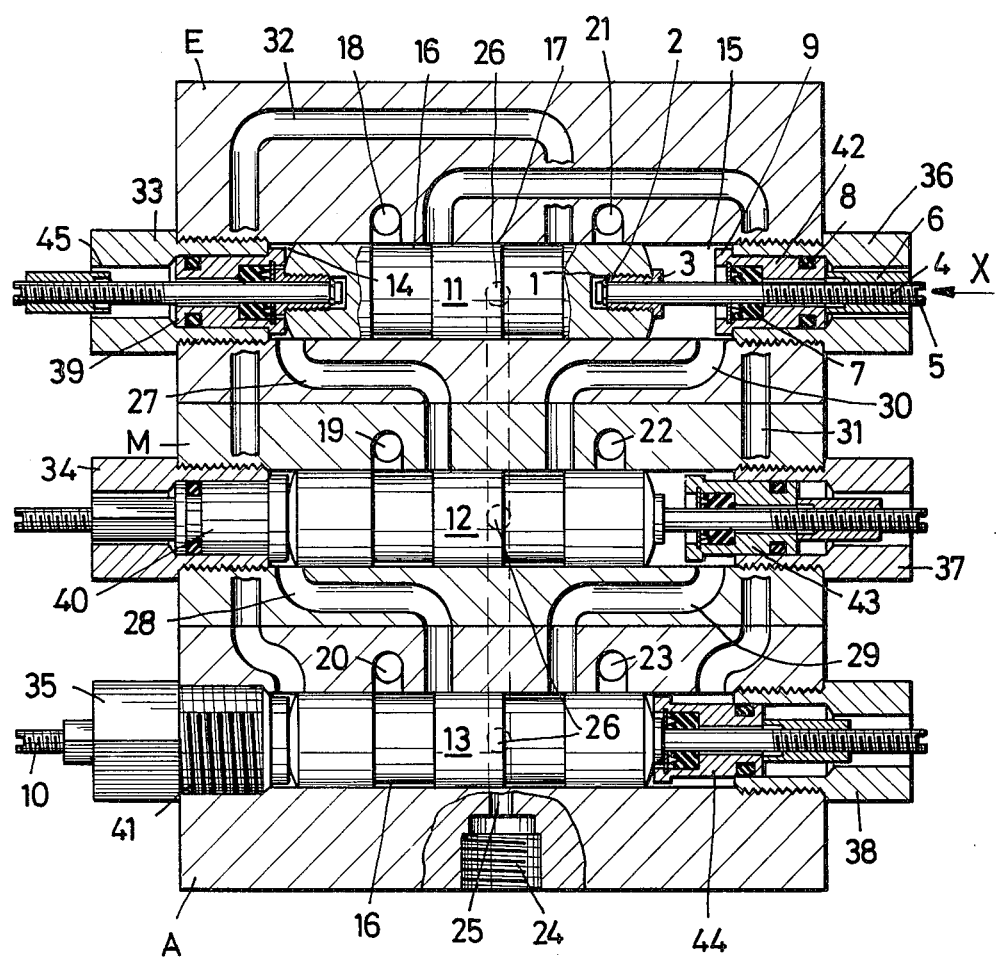
FIG. 1 illustrates, in a longitudinal cross section, an adjustable progressive distributor valve composed of three valve segments and representing an embodiment of the invention.
Figure 2:
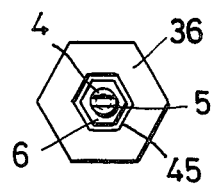
FIG. 2 shows a partial end view along arrow X of FIG. 1.

Referring to FIG. 1 of the drawing, there is illustrated an adjustable progressive distributor valve consisting of three valve segments A, M, and E, segment A being the entry segment, segment M being a typical intermediate segment, and segment E being the end segment. It should be understood that the number of intermediate segments can be increased at random.

Each valve segment has a central main bore accommodating therein a valve plunger 11, or 12, or 13, respectively. These valve plungers are freely movable within their respective bores between two fixed abutment positions. The entire valve block, including the valve plungers and other constituent elements to be described hereinafter, are arranged symmetrically with respect to a transverse plane through the center of the valve block. Each end face of the valve plunger thus delimits a metering chamber 14 or 15, respectively, while two axially spaced annular grooves define control spaces 16 bordering a central control collar 17.

The valve block has a central intake port 24 in the entry segment A, from where an intake channel 25 leads to three intake branch lines 26, intersecting the main bores of the valve segments in the valve center plane. The length of the intake control collar is such that, in each end position of the valve plunger, the latter establishes communication between the associated intake branch line 26 and one of its control spaces 16. In that position, the control space 16 is also open to a pressure line, each valve segment having two such pressure lines. The six pressure lines are indicated by the reference numerals 27 through 32, respectively. These pressure lines lead from the main bore of one valve segment to the metering chamber of the next-following valve segment. Accordingly, the pressure lines 27 and 28 link the valve segments A and E, the pressure lines 28 and 29 link the valve segments A and M, while the pressure lines 31 and 32 link the valve segments E and A. Lastly, each valve segment also has two discharge channels or branch lines, designated by numerals 18 through 23, respectively.

The pressure lines 26, etc. and the branch lines 18, etc. are axially so positioned with respect to the control spaces 16 of the valve plungers 11, etc. that, in each end position of a valve plunger, one control space 16 opens the central intake branch line 26 to one of the two pressure lines, while the other control space 16 opens the second pressure line to the discharge branch line. This means that, as the one metering chamber of the next-following valve segment receives pressurized lubricant, the lubricant thereby displaced out of its other metering chamber is discharged through a branch line of the first segment, via the pressure line which leads from that other metering chamber of the next-following segment back to the control space of the valve plunger which communicates with the particular branch line.

As can be seen in the drawing, the three valve segments A, M, and E are generally identical in configuration, except for the fact that, while the four pressure lines 27 through 30 which link adjacent valve segments extend simply across their adjoining interfaces, the pressure lines 31 and 32 which similarly link the entry segment A to the end segment E have to run through the intermediate segment, while crossing from side to side at the same time. It should be understood that the layout of these pressure lines is indicated only schematically in the drawing and that these lines may also be arranged in any other convenient manner, including the use of outside lines in the place of internal channels. In the case of multiple intermediate valve segments, the latter are exactly identical and the pressure lines extending between the entry segment A and the end segment E are then simply correspondingly longer.

The main bore in each valve segment is a smooth throughbore with threaded end portions on each side of the valve block, matching end caps 33 through 38 being seated in the bore end portions. The end caps 33, etc. thus form a portion of the metering chambers 14, etc., while at the same time determining the axial stroke of the valve plungers 11, etc. In the threaded seating portion of each end cap is arranged a cylindrical bore, somewhat smaller in diameter than the main bore of the valve plunger, metering plungers 39 through 44 being slidably received inside these bores. The larger head portion of each end cap 33, etc. is likewise centrally bored, but that bore portion is hexagonal in cross section, for reasons which will become apparent further below.

The following description of further details of the preferred embodiment of the invention will refer only to the right-hand portion of the end segment E. It should be evident from the drawing that the exact same configuration is provided in six identical metering sections, i.e. in the two sections of each valve segment.

The valve plunger 11 has arranged in its end portion a blind axial bore 1 with a flat bottom and a threaded entry portion. In this bore is engaged a threaded retaining sleeve 3 which serves as a bearing for an adjustment spindle 4 extending axially from the plunger 11 through the metering plunger 42 and through the end cap 36. This adjustment spindle 4, though rotatable, is axially retained between the bottom of the blind bore 1 and the retaining sleeve 3 by means of a retaining ring 3. The outer portion of the adjustment spindle 4 is threaded and carries on its thread an abutment nut 6 of hexagonal cross section which, in cooperation with the earlier-mentioned hexagonal bore 45 of the end cap 36, establishes an axially adjustable abutment against the outer end face of the metering plunger 42. A screwdriver slot 5 in the extremity of the adjustment spindle 4 allows for convenient adjustment of the abutment nut 6 on the spindle, through appropriate rotation of the spindle. The nut 6 slides freely inside the matching bore 45 of the end cap 36 during operation of the distributor valve.

The metering plunger 42 surrounding the adjustment spindle 4 is sealed against the latter by means of a suitable gasket 7, an O-ring 8 providing the necessary seal between the cylindrical bore of the end cap 36 and the cooperating outer diameter of the metering plunger 42. The latter further includes on its inner extremity an enlarged abutment collar 9 which is slightly smaller in diameter than the main bore and which stops the outward movement of the metering plunger 42 against the end cap 36, thereby also determining the abutment position for the valve plunger 11. This abutment position is shown on the left-hand side of the end segment E.

While the left-hand side of segment E shows the empty condition of the metering chamber, its maximum volume is shown on the right-hand side, the valve plunger 11 being in its left end position and the metering plunger 42 being abutted against the end cap 36. The adjustment spindle 4 and its cooperating abutment nut 6 now permit a convenient reduction of the maximum volume of the metering chamber 15, by advancing the abutment nut 6 to the left, thereby preventing the metering plunger 42 from moving all the way to its abutment position against the end cap 36. Such an intermediate abutment position is shown for the metering plunger 42 of the valve segment M, where the volume of the metering chamber has been reduced by an amount corresponding to the distance between the abutment collar 9 and the end cap 37 times the cross-sectional area of the metering plunger minus its bore. This reduced volume of the metering chamber correspondingly reduces the amount of lubricant which is being discharged into the corresponding branch line during each cycle. Finally, in the entry segment A, the abutment for the metering plunger 44 is adjusted for the smallest volume of the metering chamber, the metering plunger 44 being axially confined between the abutment nut 6 and the valve plunger 13. In this case, the volume of lubricant discharged into the associated branch line corresponds to the plunger stroke times the cross-sectional area defined between the metering plunger 44 and the main bore. Obviously, any kind of intermediate adjustment between the two extremes is possible. In all cases, the valve plungers 11, etc. execute a constant stroke, while the metering plungers 39, etc. are either immobile, as is the case in the adjustments of valve segment E, or move in unison with the valve plunger, as is the case in the adjustment position in the right-hand chamber of valve segment A, or they execute a portion of the valve plunger stroke, as is the case in the adjustment position in the right-hand chamber valve section M. The adjustments established on one side of the valve plunger are of no influence on the adjustments made on the other side of the same or any other valve plunger.

The fact that the adjusting spindles 4 and their abutment nuts 6 execute the same motion as the valve plungers 11 etc. also provides a convenient visual indication of that motion and of the cycling progression, the relative axial position of the abutment nuts 6 on their spindles 4 being a further convenient indication of the amount of lubricant which will be discharged into each branch line. For example, the distance of the abutment nut 6 from the spindle extremity at 10 of the entry segment A is an indication that the branch 21 will receive lubricant at approximately a median rate between the maximum and minimum adjustable rates of the valve.

The progressive distributor valve of the invention operates as follows:

The valve plunger positions shown in FIG. 1 of the drawing indicate that the right-hand metering chambers of all three valve segments have been filled, the chamber of the end segment E having been filled last. In this position of the valve plunger 11, its intake control collar 17 has just opened the intake branch line 26 to the pressure line 32, which leads to the left-hand metering chamber of the valve plunger 13 in the entry segment A. Plunger 13 will consequently now move to the right, thereby cutting the communication between its intake branch line 26 and the pressure line 29, while displacing the lubricant from its right-hand metering chamber through the pressure line 31 into the branch line 18, via the control space 16 of plunger 11. As soon as the plunger 13 has reached its right-hand end position, its control collar 17 opens the intake branch line 26 to the pressure line 28 leading to the left-hand metering chamber of valve plunger 12. The latter consequently moves to the right, thereby similarly first cutting the communication between its intake branch 26 and the pressure line 30, while gradually displacing the lubricant from its right-hand metering chamber through the pressure line 29 which, because the plunger 13 had previously been shifted to the right, discharges into the branch line 23. The same procedure is repeated at the end of the movement of the valve plunger 12 with respect to valve plunger 11 which, in turn, then controls the movement of the valve plunger 13 in the reverse sense. Thus, a continuous cycling operation takes place, the valve plungers 11, 12, and 13 cycling in reverse sequence: 13-12-11-13-12-11. The corresponding discharge sequence into the branch lines is then: 18-23-22-21-20-19. The cycling speed depends primarily on the pressure with which the lubricant is supplied to the intake port 24 and secondarily on the volume adjustment in the metering chamber, smaller volumes meaning greater plunger speed.

It should be understood, of course, that the foregoing disclosure describes only a preferred embodiment of the invention and that it is intended to cover all changes and modifications of this example of the invention which fall within the scope of the appended claims.

I claim the following:

1. An adjustable progressive distributor valve for the intermittent metered distribution of a flowable medium, for example a lubricant, to a plurality of separate destination points, in accordance with an automatic cycling operation of the valve which is generated by said medium as it enters the valve under pressure, the distributor valve comprising in combination:

a valve block having arranged therein a plurality of main bores;

a corresponding number of free valve plungers received in the main bores of the valve block for reciprocating movement therein;

an intake channel in the valve block with an intake branch line opening into each main bore for the supply of pressurized medium to each valve plunger;

a pair of metering chambers defined in part by each main bore and in part by the two extremities of the associated valve plunger, whereby an axial movement of said plunger simultaneously diminishes the volume of one chamber and increases that of the other chamber;

means for abutting each valve plunger axially in both directions, so as to determine two fixed end positions of the stroke over which each valve plunger reciprocates;

a pair of pressure lines leading from axially spaced openings in the main bore of one valve plunger to the two metering chambers of another valve plunger;

a pair of discharge branch lines leading from axially spaced openings in the main bore of each valve plunger to the outside of the valve block; and means for individually adjusting the displacement volume of each valve plunger extremity with respect to the associated metering chamber independently of said fixed plunger stroke; and wherein each valve plunger has at least two flow grooves in its midportion, and the axial locations of the intake branch line, pressure lines, and discharge branch lines opening into the associated main bore are so coordinated with the flanks of said flow grooves that said valve plunger, arriving in a stroke end position, connects one of the two associated pressure lines with the intake branch line and the other pressure line with a discharge branch line, reversing said connections when arriving in the opposite stroke end position, thereby controlling the admission of the pressurized medium into one of the metering chambers of said other valve plunger via one pressure line, and the discharge of the medium from the opposite metering chamber via the other pressure line, as the entering pressurized medium moves that other valve plunger to its opposite end position, in which that other valve plunger, in turn, establishes the pressure line connections for the movement of the next-following valve plunger, as part of a continuing automatic cycling operation; and the displacement volume adjusting means includes, for each metering chamber:

a metering plunger of smaller diameter than the valve plunger;

a matching guide bore located axially outside and adjoining the metering chamber, so that the metering plunger, when received therein, defines with its axially inwardly oriented extremity a portion of the metering chamber; and an adjustable drag connection between the valve plunger and the metering plunger, including means for adjusting the length of the drag stroke of the metering plunger over which the latter moves in unison with the valve plunger, thereby acting as a differential piston in cooperation with the latter; an increase in the length of said drag stroke thus resulting in a decrease in the effective volume of the metering chamber.

2. A progressive distributor valve as defined in claim 1, wherein the number of main bores and valve plungers arranged in the valve block is at least three;

the valve block is composed of an equal number of valve segments joined together in the form of a stack;

a first valve segment is an entry segment, another valve segment is an end segment, at least one intermediate segment being arranged therebetween; and a pair of pressure lines extends in each case from the main bore of one valve segment to the metering chambers of an adjacent valve segment, while one pair of longer pressure lines extends between the entry segment and the end segment.

3. A progressive distributor valve as defined in claim 1, wherein each main bore communicates with the intake branch line through an inlet opening which is located centrally with respect to the valve plunger;

the associated valve plunger has a central intake control collar of an axial length approximately equal to the valve plunger stroke and a pair of annular flow grooves axially adjoining said collar on each side;

the two associated pressure lines open into the main bore on opposite axial sides of said central inlet opening, at a distance from the latter corresponding to the axial length of an annular flow groove; and the two associated discharge branch lines open into the main bore axially outside the openings of the pressure lines, at a distance from the latter corresponding likewise to the axial length of an annular flow groove.

4. A progressive distributor valve as defined in claim 1, wherein the main bores for the valve plungers and the smaller guide bores for the metering plungers define abutment shoulders as transitions between them, as part of said valve plunger abutting means.

5. A progressive distributor valve as defined in claim 4, wherein the metering plungers include enlarged abutment collars at their inner extremities cooperating with said abutment shoulders, as part of said valve plunger abutting means; the valve plungers abutting against the metering plungers in their stroke end position.

6. A progressive distributor valve as defined in claim 4, wherein the main bores are through-bores in the valve block, having threaded end portions on opposite sides of the block; and threaded end caps close off both ends of each main bore, said guide bores for the metering plungers being arranged in the end caps, and said abutment shoulders being defined by their inner end faces.

7. A progressive distributor valve as defined in claim 1, wherein the adjustable drag connections between the valve plungers and the associated metering plungers further include, for each metering plunger: a central drag member extending from the valve plunger towards and through the metering plunger, slidably engaging a bore in the latter, and a shoulder on the drag member positioned axially outside the metering plunger, so as to engage the latter; and the drag stroke adjusting means is in each case, a means for adjusting the axial distance between said shoulder on the drag member and the valve plunger.

8. A progressive distributor valve as defined in claim 7, wherein the drag members are rotatable adjusting spindles, their inner end portion being journalled and axially retained in the end portions of the valve plungers, their outer end portions being threaded;

the shoulders on the drag members are defined by threaded abutment nuts, seated on the threaded spindle portions, said threaded engagement serving as the drag stroke adjusting means.

9. A progressive distributor valve as defined in claim 8, wherein the main bores are through-bores in the valve block, having threaded end portions on opposite sides of the block;

threaded end caps close off both ends of each main bore, each end cap having a central axial bore, an inner length portion thereof serving as said guide bore for the metering plunger and an outer length portion thereof surrounding said threaded abutment nut, so as to block it against rotation while leaving it free to move axially with the adjusting spindle and valve plunger; and the drag stroke adjusting means further includes tool faces on the outer extremities of the adjusting spindles for engagement by a spindle rotating tool.

10. A progressive distributor valve as defined in claim 9, wherein said outer length portions of the end cap bores are polygonal bores;

the cooperating abutment nuts have a matching polygonal cross-section, remaining in engagement with the polygonal end cap bores in all adjustment positions and all valve plunger positions.

* * * * *